(No Model.)

T. R. WHITE.
NUT LOCK.

No. 451,717. Patented May 5, 1891.

Witnesses
John Imrie
Marcus B. May.

Inventor
Thos Ritcherson White
By his Attorneys
Dimbleday & Bliss

UNITED STATES PATENT OFFICE.

THOMAS RITCHERSON WHITE, OF FINCASTLE, VIRGINIA.

NUT-LOCK.

SPECIFICATION forming part of Letters Patent No. 451,717, dated May 5, 1891.

Application filed June 10, 1890. Serial No. 354,907. (No model.)

*To all whom it may concern:*

Be it known that I, THOMAS RITCHERSON WHITE, a citizen of the United States, residing at Fincastle, in the county of Botetourt and State of Virginia, have invented certain new and useful Improvements in Nut-Locks, of which the following is a specification, reference being had therein to the accompanying drawings.

This invention relates to that class of nut-locks in which the locking devices are carried by a washer, the latter being cast separately from the nut. Heretofore in this general class the locking mechanism has been mounted on the nut itself, which has to be specially prepared for the purpose; but this I find is not desirable, as the nut is weakened thereby and is apt to break or crush under a severe strain. By using my device this is avoided, as the nut can be used without any changing, and therefore its strength is not impaired by having some of its parts cut away.

Figure 1:
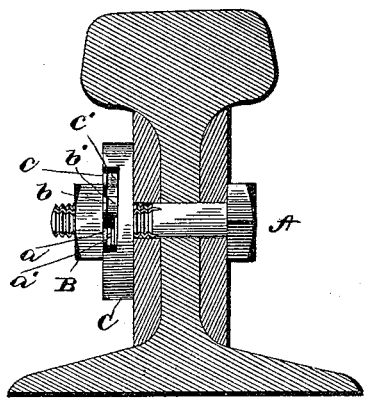
Figure 2:
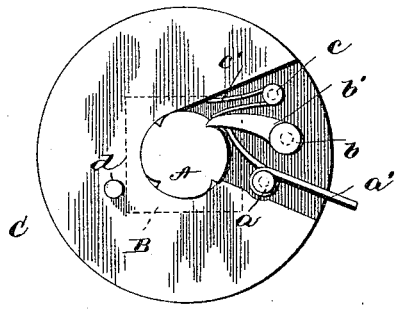

In the drawings, Figure 1 is a side view of a bolt having my nut-lock thereon. Fig. 2 is a face view of the washer, showing the pawl and the releasing device.

Like reference-letters refer to like parts in both the drawings.

A represents the bolt, which has one or more longitudinal grooves cut in the threaded part thereof.

B is the nut, which is of any ordinary sort, and C is the washer, which carries the locking and releasing devices. This washer C has a smooth bore, so that it can slide easily on the bolt. It is cast with a recess in its upper face, in which recess are three short arms or pivots $a$, $b$, and $c$, the tops of which are flush with the face of the washer. A pawl $b'$ is pivoted on the arm or pin $b$ and is adapted to be pressed into the longitudinal grooves in the bolt A by the spring $c'$. This spring $c'$ is preferably mounted with one end pressing against the pawl $b'$ and the other against the wall of the recess; but I do not limit myself to this exact construction, as any spring may be used that will accomplish the same result without departing from the spirit of my invention.

On the arm or pin $a$ is pivoted a lever $a'$, one end of which projects from the side of the washer, while the other end rests against the side of the pawl opposite to that against which the spring $c'$ presses.

$d$ is an arm or projection extending from the face of the washer and engaging with the nut.

The method of operating the lock will be readily understood from the drawings. The washer is first slipped on the bolt by pressing the lever $a'$, which in turn pushes back the pawl $b'$, thus permitting it (the washer) to slip freely on the bolt. Then the nut is screwed on and, engaging with the projection $d$, causes the washer to rotate with it. When the nut reaches its limit on the bolt, it cannot be unscrewed, as the pawl $b'$ on the washer engages with the grooves in the bolt and holds it firmly in place. When it is desired to unscrew the nut, the projecting arm of the lever $a'$ is pressed back, thus throwing back the pawl out of engagement with the grooves.

What I claim is—

In a nut-locking device, the combination, with the longitudinally-grooved bolt and the nut, of a washer sliding loosely on said bolt beneath said nut, said washer having a pawl $b$ engaging with the grooves in said bolt, a spring $a'$, the releasing-lever $c'$, and a projection $d$, engaging with said nut, substantially as set forth.

In testimony whereof I affix my signature in presence of two witnesses.

THOS. RITCHERSON WHITE.

Witnesses:
W. B. SIMMONS,
CYRUS DOGGETT.

It is hereby certified that in Letters Patent No. 451,717, granted May 5, 1891, upon the application of Thomas Ritcherson White, of Fincastle, Virginia, for an improvement in "Nut-Locks," errors appear in the printed specification requiring correction, as follows: In line 79, the reference letter "$a'$" should read $c'$, and the reference letter "$c'$" should read $a'$; and that the Letters Patent should be read with these corrections therein that the same may conform to the record of the case in the Patent Office.

Signed, countersigned, and sealed this 19th day of May, A. D. 1891.

[SEAL.]

CYRUS BUSSEY,
*Assistant Secretary of the Interior.*

Countersigned:
C. E. MITCHELL,
*Commissioner of Patents.*